(12) United States Patent
Milliron et al.

(10) Patent No.: US 8,436,860 B1
(45) Date of Patent: May 7, 2013

(54) TECHNIQUES FOR USING DEPTH MAPS

(75) Inventors: Timothy S. Milliron, Menlo Park, CA (US); Fareed Behmaram-Mosavat, Oakland, CA (US)

(73) Assignee: Pixar, Emeryville, CA (US)

(*) Notice: Subject to any disclaimer, the term of this patent is extended or adjusted under 35 U.S.C. 154(b) by 727 days.

(21) Appl. No.: 11/759,790

(22) Filed: Jun. 7, 2007

Related U.S. Application Data

(60) Provisional application No. 60/812,300, filed on Jun. 9, 2006.

(51) Int. Cl.
  *G06T 13/00* (2011.01)

(52) U.S. Cl.
  USPC .......................................... 345/474; 345/473

(58) Field of Classification Search .................. None
  See application file for complete search history.

(56) References Cited

U.S. PATENT DOCUMENTS

| | | | |
|---|---|---|---|
| 5,755,620 A * | 5/1998 | Yamamoto et al. ............. | 463/34 |
| 6,307,554 B1 * | 10/2001 | Arai et al. ..................... | 345/423 |
| 6,441,816 B1 * | 8/2002 | Nguyen et al. ................ | 345/420 |
| 6,791,549 B2 * | 9/2004 | Hubrecht et al. ............. | 345/473 |
| 6,798,415 B2 * | 9/2004 | Lake et al. .................... | 345/474 |
| 7,070,277 B2 | 7/2006 | Trumbull | |
| 7,154,507 B1 * | 12/2006 | Moreton et al. ............. | 345/582 |
| 7,206,827 B2 | 4/2007 | Viswanath et al. | |
| 7,227,526 B2 | 6/2007 | Hildreth et al. | |
| 7,545,378 B2 * | 6/2009 | Russ et al. .................... | 345/473 |
| 7,898,522 B2 | 3/2011 | Hildreth | |
| 7,928,985 B2 | 4/2011 | Goldfarb | |
| 8,095,200 B2 | 1/2012 | Quaid | |
| 2002/0135591 A1 * | 9/2002 | Zhang .......................... | 345/582 |
| 2002/0150859 A1 * | 10/2002 | Imgrund et al. ................ | 433/24 |
| 2005/0052714 A1 * | 3/2005 | Klug et al. ........................ | 359/3 |
| 2005/0253843 A1 * | 11/2005 | Losasso Petterson et al. ............................. | 345/428 |
| 2006/0139355 A1 | 6/2006 | Tak et al. | |
| 2006/0221076 A1 * | 10/2006 | Takahashi et al. ............ | 345/427 |
| 2006/0250402 A1 | 11/2006 | Perlin | |
| 2009/0184967 A1 | 7/2009 | Kulas | |
| 2010/0137882 A1 | 6/2010 | Quaid | |

OTHER PUBLICATIONS

Tecchia F., Loscos C., Chrysanthou Y.: Visualizing crowds in real-time. Computer Graphics Forum 21, 4 (2002), 753-765.*
Milliron et al., "Smart Cars: Driving the Characters in Cars," Siggraph, Aug. 2006 (1 page).
Curti, S. et al.; "3D effect generation from monocular view"; 2002, *Proceedings of the First International Symposium on 3D Data Processing Visualization and Transmission*, 4 pages.

(Continued)

*Primary Examiner* — Daniel Hajnik
(74) *Attorney, Agent, or Firm* — Kilpatrick Townsend & Stockton LLP

(57) ABSTRACT

Techniques for determining a position of a component of an animated object relative to a surface represented by a depth map and updating the state of the animated object based upon the determination. Updating the state of an animated object may change one or more of the animated object's geometric and/or non-geometric properties, such as changing the position and/or orientation of a component(s) of the animated object, changing a color associated with the animated object, and the like.

26 Claims, 11 Drawing Sheets

OTHER PUBLICATIONS

Tzovaras, D. et al.; "Disparity field and depth map coding for multiview 3D image generation"; 1998, Signal Processing: *Image Communication*, vol. 11, pp. 205-230.

U.S. Appl. No. 12/248,860, filed Oct. 9, 2008, 18 pages.

Coepijn, et al., "Beginners Guide Maya", Jun. 2005, 15 pages.

Zhang, et al., "Spacetime Faces: High Resolution Capture for Modeling and Animation," University of Washington, published 2004, 11 pages.

* cited by examiner

TECHNIQUES FOR USING DEPTH MAPS

CROSS-REFERENCES TO RELATED APPLICATIONS

The present application claims the benefit and priority under 35 U.S.C. 119(e) from U.S. Provisional Application No. 60/812,300 filed Jun. 9, 2006 entitled POSITIONING AN ANIMATED OBJECT USING A DEPTH MAP the entire contents of which are herein incorporated by reference for all purposes.

BACKGROUND OF THE INVENTION

The present invention relates to the field of computer graphics and animation, and more specifically to techniques for determining a position of a component of an animated object relative to a surface represented by a depth map and updating the state of the animated object based upon the determination.

Animation involves the generation of a series of still images that, when played back in quick succession, appear as continuously moving. In computer animation, a rendering process is used to generate a two-dimensional image of a three-dimensional scene from a given viewpoint. Animated sequences can be created by rendering a sequence of the rendered images of a scene as a scene is gradually changed over time. A great deal of effort has been devoted to making the rendered images and the resultant animation realistic.

Typically, animated objects do not need to know about the environment during an animation process. However, in certain situations, an animated object needs to know about its environment in order to be positioned appropriately with respect to the environment to increase the realism of the animation. For example, a car being animated needs to know about the ground so that the car is properly positioned on the ground. The car also has to be able to react to changes in terrain of the ground. For example, the terrain changes may correspond to speed bumps, pot holes, etc. These terrain changes may not be part of the ground surface representation but instead be represented by displacement maps in the shader code or additional objects placed on the surface. This cannot be handled by conventional techniques that handle interactions between two surfaces and require that surface characteristics be part of environment surface.

Further, in the past, in order to animate an object responsive to an environment surface, the models of both the object being animated and the environment surface had to be loaded into the memory of a processing system in order to perform the animation. This however is an "expensive" task since the environment surface model is typically very large in size and requires extensive memory and processing resources. Many times, the amount of available memory is not sufficient to load an environment surface model. An animator would much rather prefer to animate objects without having to load the surface model.

Accordingly, what is desired are improved techniques for solving some of the problems discussed above. Additionally, what is desired are improved techniques for reducing some of the drawbacks discussed above.

BRIEF SUMMARY OF THE INVENTION

Embodiments of the present invention provide techniques for determining a position of a component of an animated object relative to a surface represented by a depth map and updating the state of the animated object based upon the determination. Updating the state of an animated object may change one or more of the animated object's geometric and/or non-geometric properties, such as changing the position and/or orientation of a component(s) of the animated object, changing a color associated with the animated object, and the like.

According to an embodiment of the present invention, techniques are provided for animating an object. In this embodiment, a depth map is accessed representing a surface comprised of one or more objects and encoding displacement information associated with the one or more objects. Using the depth map, a position of a component of the animated object relative to the surface represented by the depth map is determined. A state of the animated object is then updated based upon the determining. The updated state of the animated object may be used for rendering the animated object using an output device.

In one embodiment, a depth map may be selected from a plurality of depth maps. In this embodiment, the plurality of depth maps is searched to identify one or more depth maps that contain the component of the animated object. A depth map from the one or more depth maps is then selected. The selected depth map is then used to determine a position of a component of the animated object relative to the surface represented by the depth map. Various techniques may be used for selecting a depth map from the one or more depth maps. In one embodiment, the depth map with the highest resolution is selected.

Determining the position of a component of an animated object relative to a surface represented by a depth map comprises determining, using the depth map, if the component is positioned below or above or on the surface represented by the depth map. This may be done by computing a position of the component of the animated object in the image space of the depth map and comparing a depth value of the component of the animated object with the depth value stored by the depth map for the position of the component of the animated object in the image space of the depth map.

Updating the state of the animated object may involve updating the geometric or non-geometric attributes of the animated object. In one embodiment, updating the state of the animated object comprises modifying a position of the component of the animated object. For example, the position of the component of the animated object may be modified such that it lies on the surface represented by the depth map. The position modification may be done by changing the position of the component along a direction used to define the depth map or by changing the position of the component along a direction that is different from a direction used to define the depth map. Updating the state of the animated object may also comprise modifying an orientation of the component of the animated object.

In one embodiment, the determination of the position of a component of the animated object with respect to a surface represented by a depth map covering one or more objects may be performed without loading one or more models of the one or more objects represented by the depth map or displacement information associated with the one or more models.

According to an embodiment of the present invention, techniques are provided for selecting a depth map from a plurality of depth maps. In this embodiment, a depth map is selected from a plurality of depth maps based upon a position of a component of an animated object. Each depth map in the plurality of depth maps represents a surface comprised of one or more objects and encodes displacement information associated with the one or more objects. In one embodiment, selecting a depth map from the plurality of depth maps based upon the position of the component comprises searching the plurality of depth maps to identify one or more depth maps that contain the component of the animated object, and selecting a depth map from the one or more depth maps having the highest resolution.

The selected depth map may then be used to determine a position of the component of the animated object relative to a surface represented by the selected depth map, and update a state of the animated object based upon the determining of the position of the component. Updating the state of the animated object may comprise modifying at least one of a geometric attribute or a non-geometric attribute of the animated object. For example, in one embodiment, the state may be updated such that at least one of a position and an orientation of the component of the animated object is modified. The updated state of the animated object may be used for rendering the animated object using an output device.

In one embodiment, the plurality of depth maps may be stored in a data structure or a database. Selecting the depth map from the plurality of depth maps may comprise searching the database or data structure to find a depth map from the plurality of depth maps that contains the component of the animated object.

According to another embodiment of the present invention, techniques are provided for selecting a depth map from a plurality of depth maps. In this embodiment, information is received identifying a first named category. A depth map is selected from the plurality of depth maps based upon a position of a component of an animated object and the first named category, each depth map in the plurality of depth maps representing a surface comprised of one or more objects and encoding displacement information associated with the one or more objects. Selecting a depth map may comprise searching the plurality of depth maps to identify one or more depth maps that contain the component of the animated object and belong to the first named category, and selecting a depth map from the one or more depth maps having the highest resolution.

The selected depth map may be used to determine the position of a component of the animated object relative to the surface represented by the depth map. Based upon the determination, a state of the animated object may be updated. The updated state of the animated object may be used for rendering the animated object using an output device.

In one embodiment, the plurality of depth maps comprises at least a first set of depth maps belonging to a first priority and a second set of depth maps belonging to a second priority, the second priority being lower than the first priority. In this embodiment, selecting the depth map comprises searching the first set of depth maps to find a depth map containing the component of the animated object and belonging to the first named category, and searching the second set of depth maps only if a depth map containing the component of the animated object and belonging to the first named category is not found in the first set of depth maps.

If multiple depth maps contain the component of the animated object and also belong to the first named category, then a depth map with the highest resolution is selected from the multiple depth maps.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for determining a position of a component of an animated object relative to a surface represented by a depth map and updating the state of the animated object based upon the determination.

A depth map is generally used for representing and storing depth information taken from a scene. A depth map (also referred to as a z-map or texture map or a shadow map) is generally a two-dimensional array wherein one dimension (e.g., rows) of the array corresponds to location along the X axis in an image and the other dimension (e.g., columns) corresponds to location along the Y axis in an image. The intersection of a row and a column represents an array element or a pixel. In a depth map, the array elements (pixels) store depth values (z values) for X and Y locations in the image.

Figure 1:
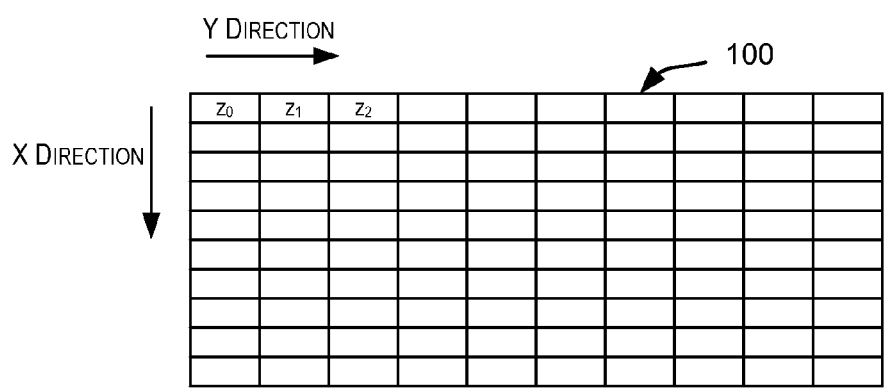
FIG. 1 depicts a simplified two-dimensional array depth map storing depth or z-values according to an embodiment of the present invention.

FIG. 1 depicts a simplified two-dimensional array depth map 100 storing depth or z-values (e.g., $Z_0$, $Z_1$, $Z_2$, etc.). The z-values may be computed from the perspective of a given light source or camera. As depicted in FIG. 1, the rows correspond to the X direction and the columns correspond to the Y direction. For each (x,y) index pair of the depth map, a z value is stored that specifies the depth at which the light emitted by a light source positioned at the camera location is blocked by a surface in the scene at the (x,y) location in the image. The values stored in a depth map specify the distance (depth) from the camera at which a first surface is encountered.

Depth maps are generally used for determining shadow effects in rendering a scene and are thus sometimes also referred to as shadow maps. A shadow map is used to determine if a point in a scene is in shadow or not. Elements having depth values greater than the given z value at a particular (x,y) image location are shadowed, whereas elements that have depth values less than the given z value are lit.

According to an embodiment of the present invention, a depth map stores information representing a surface comprised of one or more objects. The z-values of the depth map encode the shape of the surface as seen from one angle. A depth map also captures displacement information associated with the one or more objects such as surface information from bumps maps, displacement maps, shader details, etc. that are not available in the surface representation. Depth maps may represent any number of surfaces. Different techniques may be used to generate a depth map. In one embodiment, a depth map is generated by rendering an image of z values of one or more objects captured using a camera.

For example, in order to generate a depth map for a ground surface, a camera positioned in the direction of gravity may be used to capture and render an image of z values that represent the ground surface. In alternative embodiments, some other camera direction may also be used to define the surface represented by the depth map.

According to an embodiment of the present invention, processing is performed to determine positions of one or more components of an animated object relative to a surface represented by a depth map. Examples of a component include a point of the animated object, points of a mesh of an animated object, the transformation matrix of an animated object, a face of the animated object, etc. In general, a component of an animated object may refer to any geometric attribute of an animated object.

Since a depth map stores z-values, the surface represented by a depth map is a thin surface with no volume. As a result, a component of an animated object is either positioned below the surface represented by the depth map, on the surface represented by the depth map, or above the surface represented by the depth map. The determination of the position of a component of an animated object with respect to the surface represented by a depth map may be used to update or modify the attributes or state of the animated object. Updating the state of an animated object may change one or more of the animated object's geometric and/or non-geometric properties, such as changing the position and/or orientation of a component(s) of the animated object, changing a color associated with the animated object, and the like.

As part of the processing, the position of the component relative to the surface represented by the depth map is first determined. This may be determined by computing the (x,y) position of the component in the image space of the depth map and comparing the z-value of the component with the z value stored by the depth map for that (x,y) position. This comparison determines whether the component is positioned above the surface represented by the depth map, below the surface, or on the surface. Based upon the position of the component of the animated object with respect to the surface represented by the depth map, the attributes or state of the animated object may be modified or updated. Updating the state may involve changing geometric and/or non-geometric attributes of the animated object. For example, the state of the animated object may be updated such that the position and/or orientation of the component of the animated object or of other components of the animated object is modified. Non-geometric attributes of the animated object may also be modified such as a color associated with the animated object, etc.

For example, a depth map representing a ground surface may be used to update the state of a car animated object moving over the ground surface. In this example, the component of the car object may be a set of one or more points on the wheel of the car. A depth map representing the ground surface may be used to determine if the points are below the ground surface, above the ground surface, or on the ground surface. Based upon this determination, the transformation matrix of the car object may be positioned and/or oriented to a position and/or orientation desired by the animator. Since the depth map information encapsulates information about the ground terrain (e.g., information about bumps or holes in the ground surface), as the car rolls over the ground surface, the position of the car may be appropriately modified using the depth map such that the car is positioned on the ground surface. This enhances the realism of the animation and makes it appear that the animated object is reactive to the surface. The car appears to react to bumps, holes, etc. in the ground and is always placed on the ground surface.

Figure 2:
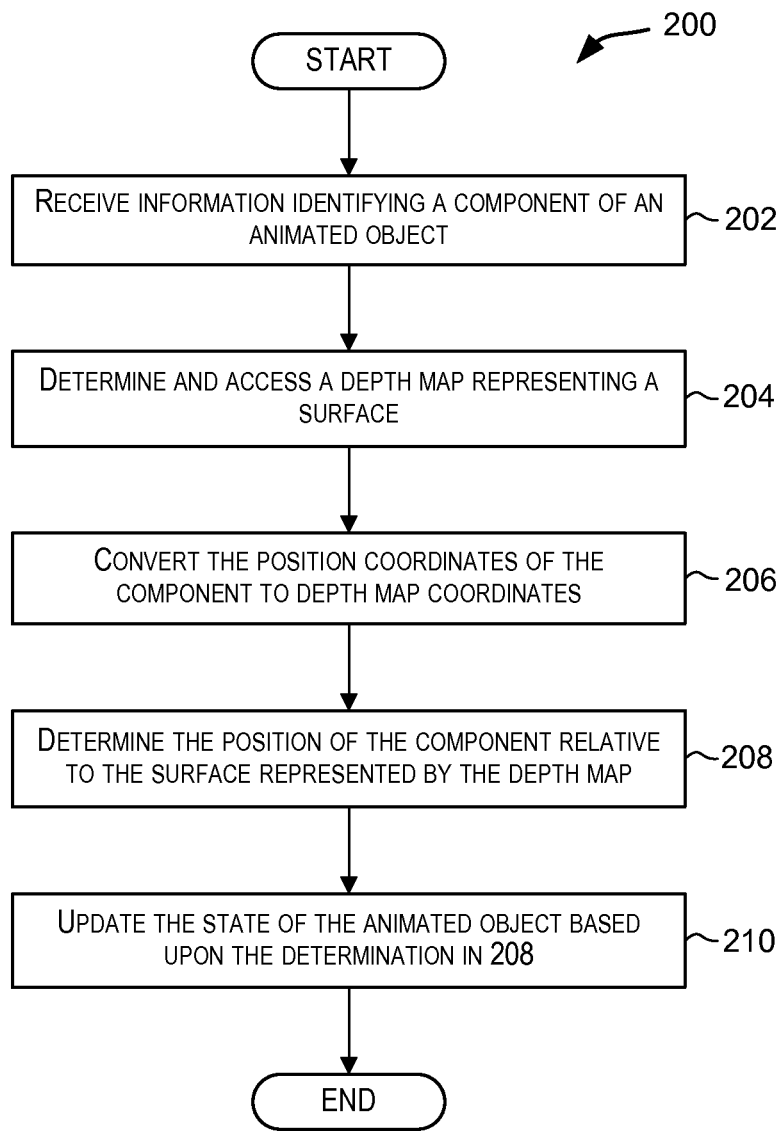
FIG. 2 depicts a simplified flowchart showing a method of updating the state of an animated object using a depth map according to an embodiment of the present invention.

FIG. 2 depicts a simplified flowchart 200 showing a method of updating the state of an animated object using a depth map according to an embodiment of the present invention. The processing depicted in flowchart 200 may be performed by hardware modules, software modules (e.g., code or instructions that may be stored on a computer-readable medium) executed by a processor, or combinations thereof.

Processing is initiated upon receiving information identifying a component of an animated object (step 202). The component may be a point, a set of points of a mesh, a transformation matrix of a geometric attribute of the animated object, a face of the animated object, or any other geometric attribute of the animated object.

A depth map representing a surface is determined and accessed (step 204). The depth map may be a rendering of the z-values representing a surface comprised of one or more objects and including their displacement information. The displacement information encoded by a depth map may include the shape of the surface including shader details, bump maps, displacement maps, etc. associated with the one or more objects. The depth map may be accessed from a memory location accessible to the animation system. The depth map is typically rendered prior to the animation and is thus available prior to step 202.

The position coordinates of the component of the animated object identified in 202 are converted to depth map coordinates (the coordinate-space of the camera used to define the depth map) (step 206). This is optional and is done to facilitate calculations using the depth map. Since the depth values in the depth map accessed in 204 are in depth map coordinates, by converting the component coordinates to depth map coordinates, the resultant z-values of the component can be directly compared to z-values in the depth map.

The position of the component of the animated object relative to the surface represented by the depth map accessed in 204 is determined (step 208). The determination is made based upon the position coordinates of the component determined in step 206 and based on depth values stored in the depth map accessed in 204 for that position. In one embodiment, the determination is done by comparing the z coordinate of the component to the z value stored in the depth map corresponding to the (x,y) location of the component.

Based upon the determination made in step 208, the state of the animated object is updated (step 210). Updating the state of an animated object may change one or more of the animated object's geometric and/or non-geometric properties, such as changing the position and/or orientation of a component(s) of the animated object, changing a color associated with the animated object, and the like.

In one embodiment, the state of the animated object may be updated in 210 to achieve a position and/or orientation of the component (or of other components) of the animated object that is desired by the animator. This may be done to increase the realism of the resultant animation. The state of the animated object may also be modified simply to inform the animator of the determined position of the component relative to the surface represented by the depth map. For instance, the color of tires of a car object may be changed to a particular color (e.g., red) if any of its points are determined to be below the surface represented by the depth map.

Figure 3:
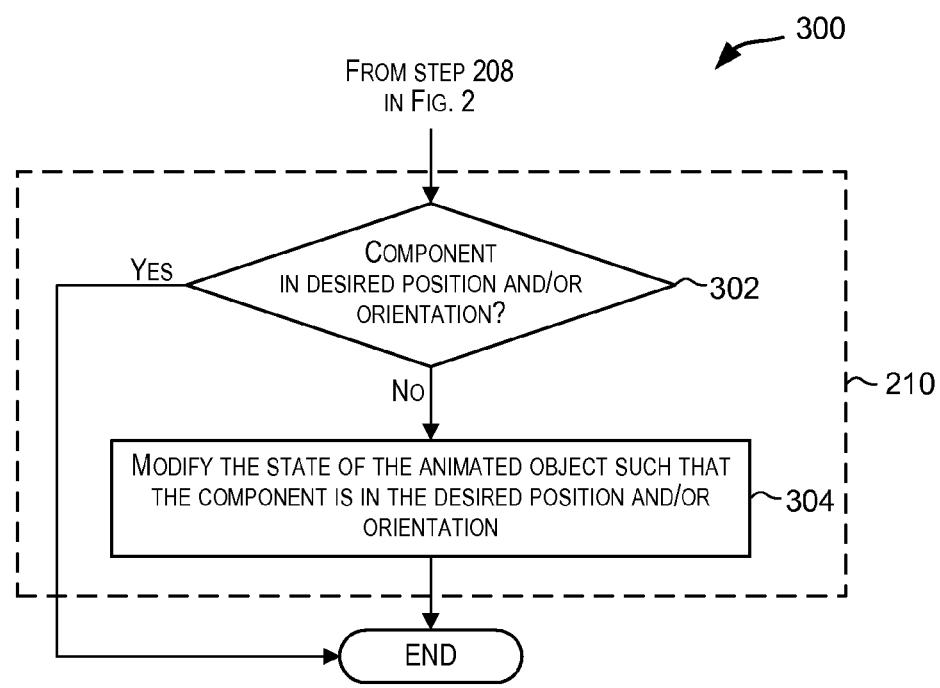
FIG. 3 depicts a simplified flowchart showing a method for updating the state of an animated object to position and/or orient a component of the animated object to a desired position and/or orientation with respect to a surface represented by a depth map according to an embodiment of the present invention.

FIG. 3 depicts a simplified flowchart 300 showing a method for updating the state of an animated object to position and/or orient a component of the animated object to a desired position and/or orientation with respect to a surface represented by a depth map according to an embodiment of the present invention. As depicted in FIG. 3, upon determining a position of the component of the animated object relative to the surface represented by the depth map in step 208 of FIG. 2, a check is made to see if the component of the animated object is in a position and/or orientation desired by the animator (step 302). If it is determined in 302 that the component is not in a desired position and/or orientation, then the state of the animated object is changed to place the component in the desired position and/or orientation (step 304). In this manner, the state of the animated object is updated to change the position and/or orientation of the component of the animated object.

While the processing depicted in FIGS. 2 and 3 refer to a single component of the animated object, in alternative embodiments, the processing may also be applied to multiple components of an animated object. The state of the animated object may then be updated based upon the result of the processing of the multiple components.

The processing depicted in FIGS. 2 and 3 may be used, for example, to position and/orient components of a car object. In this scenario, the depth map may represent the ground surface, The component of the car object may be one or more points on a wheel of the car object that are supposed to be in contact with a ground surface represented by the depth map. In such a scenario, if it is determined in 208 that the points are either above or below the ground surface represented by the depth map, the positions of the points may be changed in 210 to place them on the surface represented by the depth map. By doing this, the wheel may be "locked" to the surface. As the car changes location over the ground surface (e.g., rolls on the ground surface), the depth map representing the ground surface may be used again to determine the position of the points relative to the ground surface and the state of the car object may be updated such that the points are locked to the ground surface whose terrain may change (e.g., pot holes, bumps, etc.).

In one embodiment, the degree of the modification needed to make a point be placed on the surface represented by the depth map may be determined by comparing the position of the point and the value in the depth map corresponding to the point location. This may be done by projecting the point towards the surface such that the modified position of the point is placed on the surface. It is assumed for purposes of describing FIGS. 2 and 3 that the point is projected in a direction parallel to the direction of the camera used to define the depth map. Accordingly, the position of the point of the animated object is modified along a direction that is parallel to the direction of the camera used for rendering the depth map. Projecting the point along the view direction of the camera is equivalent to replacing the z-coordinate of the point in camera space with the z value read from the depth map for the (x,y) coordinates of the point. Thus, the projection is very efficient. The position of the point of the animated object is modified based upon the point's position relative to the surface represented by the depth map.

The desired position of a component of an animated object does not always have to be placed on the surface. The desired position of the component may be at some location either above or below the surface represented by the depth map and the state of the animated object may be modified accordingly. In one embodiment, the position of the component of the animated object is modified to make the component be positioned on the surface represented by the depth map only if the position of the component is determined to be below the surface represented by the depth map. For example, a point on the wheel of a car object is projected up to the ground surface in 210 only if it is determined in 208 that the point is below the surface represented by the depth map.

The position of a component of an animated object relative to the surface represented by a depth map may be used to change the position and/or orientation of other components of the animated object. In one embodiment, since the relative distances between the components of the animated object stay the same in order to preserve the rigid shape of the animated object, the changes in positions of the other components (e.g., points) of the animated object may be determined based upon the change in position and/or orientation of the component whose position is determined relative to the surface represented by the depth map.

Figure 4A:
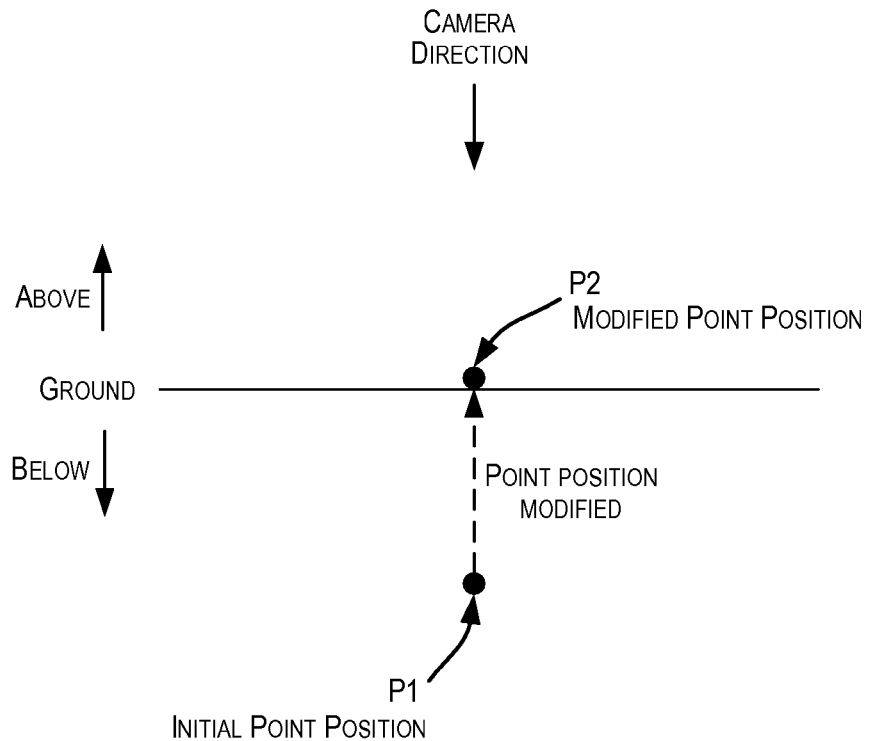
FIGS. 4A and 4B illustrate examples of modifying the state of an animated object to position a component of the animated object to a desired position relative to a surface represented by a depth map according to an embodiment of the present invention.
Figure 4B:
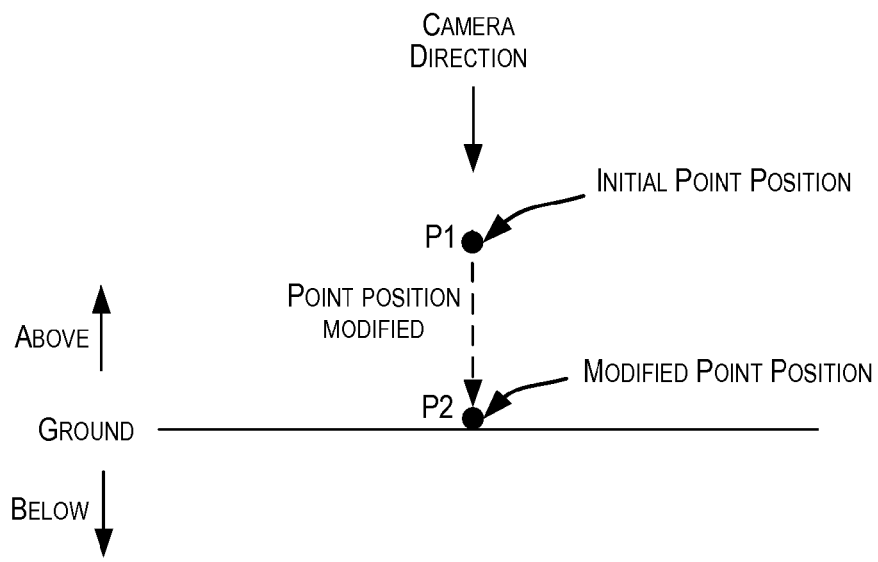

FIGS. 4A and 4B illustrate examples of modifying the state of an animated object to position a component of the animated object to a desired position relative to a surface represented by a depth map according to an embodiment of the present invention. It is assumed for the example depicted in FIGS. 4A and 4B that the component is a point of the animated object and that the desired position of the point is on the surface represented by the depth map. As depicted in FIG. 4A, position P1 represents the initial position of a point of the animated object. Upon comparing the point position with corresponding values stored in a depth map representing the ground surface, it is determined that position P1 is positioned below the ground surface. Accordingly, the state of the animated object is updated such that the position of the point is modified from P1 to P2 which lies on the ground surface. In one embodiment, this may be done by projecting the point up towards the ground surface along a direction parallel to the camera direction used to define the depth map being used such that the modified point position is on the ground surface represented by the depth map. In this manner, the position of the point is modified and "pushed up" to the ground surface such that the modified position sits on the ground surface.

In the example depicted in FIG. 4B, upon comparing the point position P1 with corresponding values stored in a depth map representing the ground surface, it is determined that position P1 is above the ground surface. Accordingly, the position of the point is modified from P1 to P2 by projecting the point down towards the ground surface along a direction parallel to the camera direction used to define the depth map such that the modified point position is placed on the ground surface. In this manner, the position of the point is modified and "pushed down" to the ground such that the modified position sits on the ground surface.

Figure 5A:
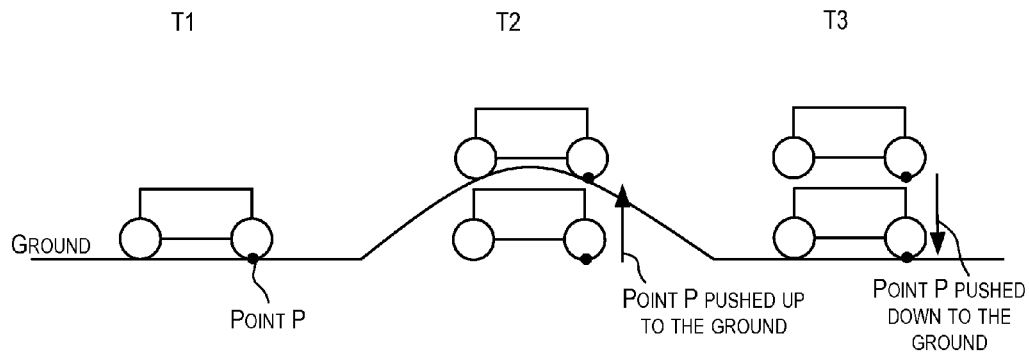
FIGS. 5A and 5B depict pictorial examples of positioning a car on a ground surface using a depth map according to an embodiment of the present invention.
Figure 5B:
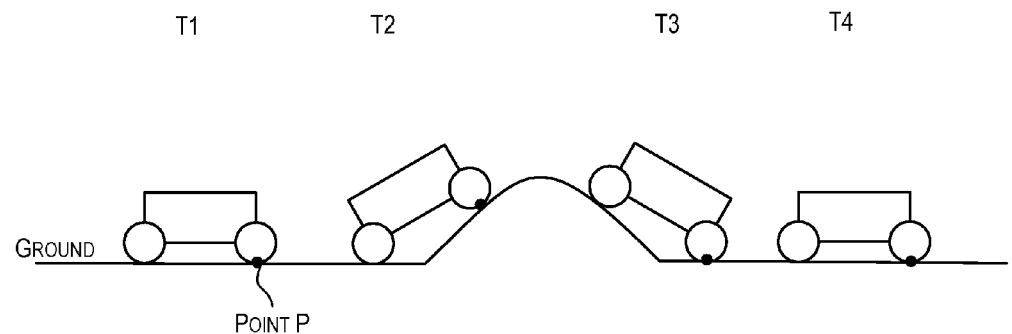

FIGS. 5A and 5B depict pictorial examples of positioning a car on a ground surface using a depth map according to an embodiment of the present invention. In the example depicted in FIG. 5A, at time T1, the state of the car object is such that the car is positioned on the surface of the ground such that a point P of the car is placed on the ground. At time T2, as the car travels over the ground surface to a new location, a depth map representing the ground surface may be used to determine the position of the car relative to the ground surface. The terrain or shape of the ground surface at the new location as represented by the depth map may have a bump as depicted in FIG. 5A. Accordingly, at T2, the state of the car object may be updated such that the position of point P is modified (projected up to the ground surface) such that point P is placed on the ground surface represented by the depth map. The state of the car object may be modified to update other geometric and/or non-geometric attributes of the car object based upon determination of point P's position relative to the surface repented by the depth map. At time T3, as the car travels over the ground surface to yet another new location, the depth map representing the ground surface may be used again to determine the position of the car relative to the ground surface. As depicted in FIG. 5A, at the new location, the ground surface as represented by the depth map may be level again (i.e., not have a bump). Accordingly, at T3, upon determining the position of point P relative to the ground surface represented by the depth map, the state of the car animated object may be modified such that the position of point P is modified (pushed down to the ground surface) to place it on the ground surface. The state of the car object may be modified to update other geometric and/or non-geometric attributes of the car object based upon the determination of point P's position relative to the surface represented by the depth map.

In the example depicted in FIG. 5B, at time T1, the state of the car object is such that the car is positioned on the ground surface represented by a depth map such that a point P of the car is placed on the ground. At T2, as the car travels to a new location, the depth map representing the ground surface may be used to determine the position of the point relative to the ground surface. The terrain of the ground surface at the new location as represented by a depth map may have a front side of a bump as depicted in FIG. 5B. Accordingly, at T2, the state of the car object is modified such that point P is placed on the ground surface. The state of the car object may be further modified to update one or more other geometric or non-geometric attributes, such as to change the orientation of the car as depicted in FIG. 5B. At time T3, the car travels to yet another new location. At this new location, the ground surface as represented by the depth map may have a backside of a bump. At T3, the position of point P is determined relative to the ground surface using the depth map representing the ground surface. The state of the car object may be updated such that point P is pushed down to the ground surface. The state of the car object may be further modified to update one or more other geometric or non-geometric attributes, such as to change the orientation of the car as depicted in FIG. 5B. At time T4, the car travels to yet another new location, At this new location, the ground surface as represented by the depth map may be level again (i.e., not have a bump). Accordingly, at T4, the position of point P is determined relative to the ground surface using the depth map representing the ground surface. The state of the car object may be updated such that point P is placed on the ground surface. The state of the car object may be further modified to update one or more other geometric or non-geometric attributes of the car object.

In this manner, the state of the car object is updated such that the resultant position of the car is such that the tires of the car are glued or locked to the ground surface (i.e., are positioned on the ground surface) for different ground terrains and the car is oriented on the ground surface. If the car rolls over varying terrain, then the position and orientation of the car is also modified such that the car is placed on the ground surface. Accordingly, the position and orientation of the car changes responsive to or reactive to changes in the ground terrain as encoded in the depth map representing the ground, thereby making the resultant animation look more realistic. For a car with multiple wheels, each wheel of the car may be locked to the ground independently using the techniques described above.

In the manner described above, the state of an animated object may be updated or modified based upon the determined position of one or more components of an animated object relative to a surface represented by a depth map. Updating the state of an animated object may change one or more of the animated object's geometric and/or non-geometric properties, such as changing the position and/or orientation of a component(s) of the animated object, changing a color associated with the animated object, and the like.

As described above, the depth map is an image of a surface and encodes any shape of any number of surfaces comprising one or more objects. The depth map encodes displacement information including shader details, bump maps, displacement maps, etc. that are not part of the surface representation. Accordingly, for processing related to a surface represented by a depth map, only the depth map needs to be accessed and loaded into memory. The surface objects (surface object models) and their displacement information (e.g., bump maps, displacement maps, etc.), which are generally much larger in size compared to the depth map representing the surface, do not have to be loaded into memory during animation. This enables an object to be animated with respect to a surface without having to incur the expense of loading the surface models—only the depth map representing the surface is loaded in the RAM of a processing system. In this manner, less memory resources are required for the processing.

There are various ways in which a position of a component of an animated object is modified based upon the determination of the position of the component of the animated object relative to a surface represented by a depth map. The embodiments depicted in FIGS. 4A and 4B assumed that the position of the component of the animated object is modified by projecting the component along a direction that is parallel to the direction of the camera used to define the depth map. However, this may not be desirable in all instances. There are several instances where the direction of the projection may not be parallel to the view direction of the camera used to define the depth map. For example, if a car were located on a slope or a banked track, then you want the point of the tires of the car to project to the ground in a direction downward with respect to the car—that is in a direction perpendicular to the car's chassis and this direction may not be parallel to the view direction of the camera used to define the depth map. Accordingly, in such a situation, in order to position the component of the animated object on the surface (or any other desired position relative to the surface represented by a depth map), the component's position may be projected along a direction that is not parallel to the camera direction used to define the depth map.

Figure 6:
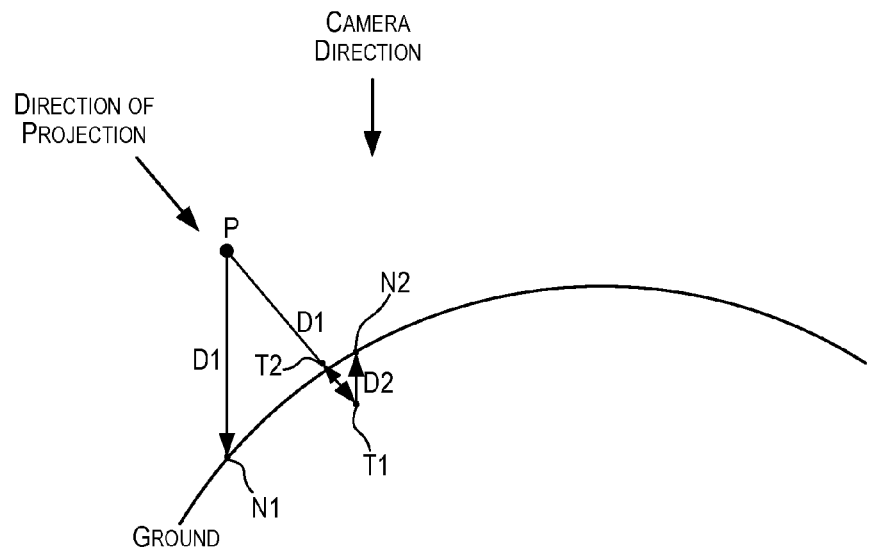
FIG. 6 depicts an iteration technique that may be used to position a point on a surface according to an embodiment of the present invention.

In the above situation, in one embodiment of the present invention, an iterative solve is used to find the modified position of the component of the animated object relative to the surface. Various different solution techniques may be used to determine the modified position of the component of the animated object. One such technique is depicted in FIG. 6 according to an embodiment of the present invention. In the embodiment depicted in FIG. 6 it is assumed that the component is a point of an animated object and the desired position for the point is on the surface represented by a depth map. As depicted in FIG. 6, the direction in which point P is to be projected is different from the direction of the camera defining the depth map According to the iteration technique used in FIG. 6, a distance D1 is determined by projecting the point P in a direction parallel to the camera direction to a point N1 on the ground surface. Point P is then projected along the desired projection direction to a point T1 that is D1 distance from P along the desired projection direction. A determination is then made, using the depth map representing the ground surface, if point T1 is above, below, or on the ground surface. In one embodiment, the point may be considered to be on the ground if it is within a threshold distance from the ground. This threshold distance may be user configurable.

As depicted in FIG. 6, point T1 is below the ground surface. A distance D2 is then determined by projecting the point T1 in a direction parallel to the camera direction to a point N2 on the ground. Point P is then projected along the desired projection direction to a point T2 that is D2 distance from T1 along the desired projection direction. A determination is then again made, using the depth map for the ground surface, if point T2 is above, below, or on the ground surface. In this manner, the iteration continues until point P is projected a distance that causes it to be positioned on the ground surface. As described above, the point may be considered to be on the ground surface if it is within a threshold distance from the ground surface. Various other iteration techniques may also be used in alternative embodiments.

As described above, a depth map is used to represent at least one surface such as a ground and encodes shape information for the surface. Since a surface such as the ground can be very large, the depth map needed to represent such a surface for a desired resolution level may also be quite large (many gigabytes). As previously described, in order to perform processing using a depth map, the depth map has to be loaded into the memory (RAM) of the computer system doing the processing. Many times, due to its large size, it may not be possible to load the entire large depth map representing a surface in the RAM of a processing system in order to perform the processing.

According to an embodiment of the present invention, instead of the surface being represented by one large depth map, the surface may be represented by tiling several small depth maps. Each depth map in the tiled set may represent a unique portion of the surface. Each tiled depth map comprises information (e.g., a header of the depth map) that identifies the area of the surface covered by the depth map. When the position of a component of an animated object relative to a surface is to be determined, only those one or more depth maps that contain the position of the component of the animated object need to be loaded into the RAM of the processing system in order to do the processing. Accordingly, instead of loading a large depth map representing the entire surface, a smaller tiled depth map representing the portion of the surface containing the position of the component of the animated object may be loaded into the RAM of the processing system. The processing system is programmed to swap depth maps in and out of memory as needed for the animation. The swapping in and out of depth maps, enables the animation system to perform processing for a large environment surface using reduced memory and processing resources, where the available memory resources (RAM) may not be sufficient to load a large depth map representing the entire surface. A depth map for the entire surface does not have to be loaded. A database (or some memory repository) may be provided for storing the tiled depth maps or textures that represent a surface.

According to an embodiment of the present invention, multiple depth maps may be provided covering portions of one or more surface. Two or more depth maps may represent the same portion of a surface. Further, the depth maps may have different resolutions. According to an embodiment of the present invention, the amount of space on the surface covered by a pixel of a depth map is considered as the resolution of the depth map. Accordingly, a depth map with the highest resolution is one where a pixel of the depth map represents the smallest feature (small feature sizes) in world space. In such an embodiment, as part of the processing for determining a position of a component of an animated object relative to a surface, processing is performed to identify a depth map from the multiple depth maps to be used for the processing.

Figure 7:
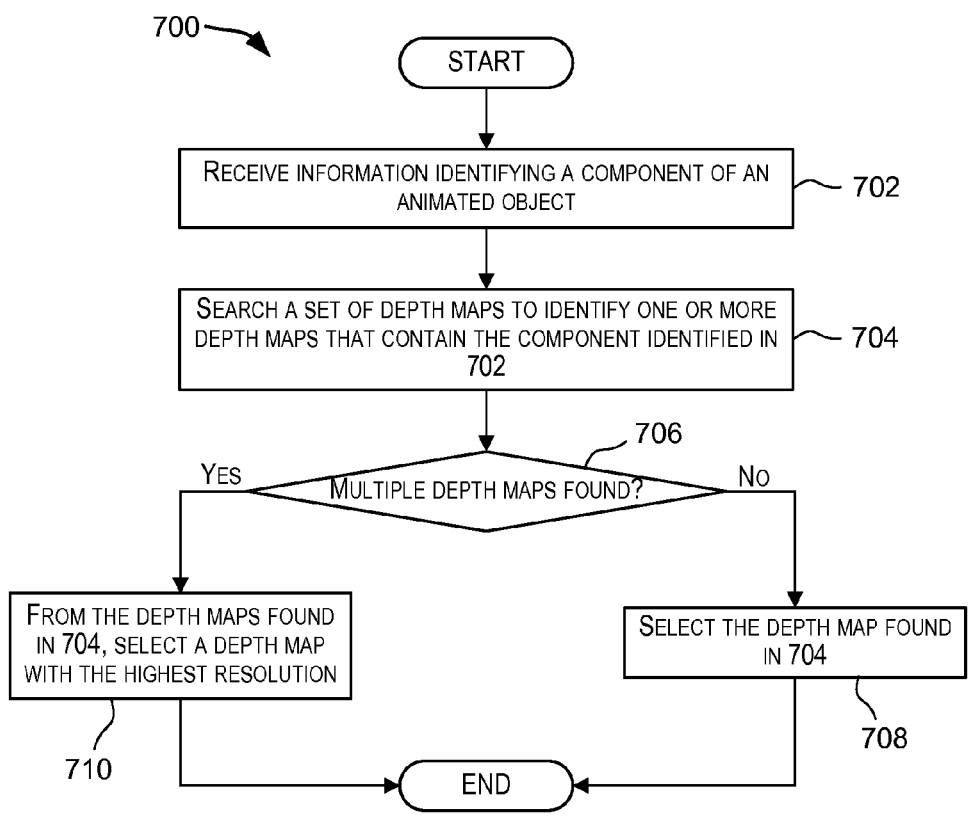
FIG. 7 depicts a simplified flowchart showing a method for selecting a depth map from multiple depth maps according to an embodiment of the present invention.

FIG. 7 depicts a simplified flowchart 700 showing a method for selecting a depth map from multiple depth maps according to an embodiment of the present invention. The processing depicted in flowchart 700 may be performed by hardware modules, software modules (e.g., code or instructions executed by a processor), or combinations thereof. An animation system may be configured to perform the processing depicted in FIG. 7.

As depicted in FIG. 7, processing is initiated upon receiving information identifying a component of an animated object whose position is to be determined relative to a surface (step 702). The available depth maps are then searched to identify one or more depth maps that contain the component identified in 702 (step 704). A depth map contains the component if the location of the component falls within the region of the surface covered by the depth map, i.e., the component's coordinates in depth map camera space are covered by pixels in the depth map.

A check is then made to see if multiple depth maps were found in 704 to contain the component (step 706). If it is determined in 706 that a single depth map was found in 706 to contain the component, then that depth map is selected (step 708). If it is determined in 706 that search in 704 yielded multiple depth maps that contain the component, then from the depth maps identified in 704, the depth map with the highest resolution is selected (step 710). In this manner, if multiple depth maps contain the component, then depth maps with higher resolutions are preferred. A depth map selected according to the processing depicted in FIG. 7 may then be used to determine the position of the component of the animated object relative to the surface represented by the selected depth map. As part of the processing, the selected depth map may be loaded into the RAM of the processing system and then used to determine a position of the component relative to the surface represented by the selected depth map.

Figure 8:
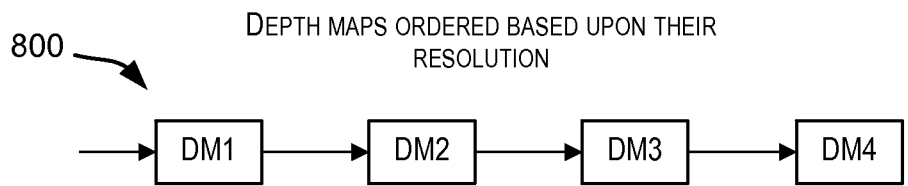
FIG. 8 depicts a simplified diagram of a data structure for storing multiple depth maps according to an embodiment of the present invention.

Different techniques may be used for storing multiple depth maps. For example, different types of data structures may be used to store depth maps. The data structure allows storage of depth maps in a sorted or ordered form based upon the resolutions of the depth maps. This facilitates selection of a depth map with the highest resolution. FIG. 8 depicts a simplified diagram of a data structure 800 for storing multiple depth maps according to an embodiment of the present invention. As depicted in FIG. 8, structure 800 is a queue storing a list of depth maps. The depth maps in the list may be ordered based upon some criteria. In one embodiment, the depth maps in the list are ordered based upon their resolution with higher resolution depth maps placed closer to the head of the list. For example, in the embodiment depicted in FIG. 8, depth map DM1 has a resolution at least as high as depth map DM2, depth map DM2 has a resolution at least as high as depth map DM3, and depth map DM3 has a resolution at least as high as depth map DM4. This facilitates selection of a depth map with the highest resolution since the first depth map in the list containing the component of the animated object is guaranteed to have a resolution no lower than later depth maps in the list.

As described above, multiple depth maps may be defined for a surface, potentially for the same portions of the surface. Further, there may be instances where different reactions to a surface are desired for different animated objects. For example, consider a surface representing a field filled with crops. An animator may want different animated objects to react differently as they move over the field. For example, the animator may want a heavy vehicle such as a tractor to "sink" more into the crops and move smoothly through the field and not be affected much by the ruts in the field. On the other hand, the animator may want a lighter object such as a car not to "sink" as much as the tractor in the field and have a rough ride while traveling through the same field. In one embodiment, this may be achieved by configuring different customized depth maps representing the field for the tractor and for the car.

According to an embodiment of the present invention, categories of depth maps may be created, each category identified by a category name. A depth map may be tagged or classified as belonging to one or more different categories. In one embodiment, depth maps that are not assigned to any category are considered as belonging to a "standard" category. A depth map may also be classified as belonging to the standard category. Two or more depth maps, possibly belonging to the same or two different categories may represent the same portion of a surface. Categories provide a way for organizing the depth maps that enables faster identification of a depth map to be used for animation. In one embodiment, information is provided identifying the one or more categories to which a depth map belongs.

Figure 9:
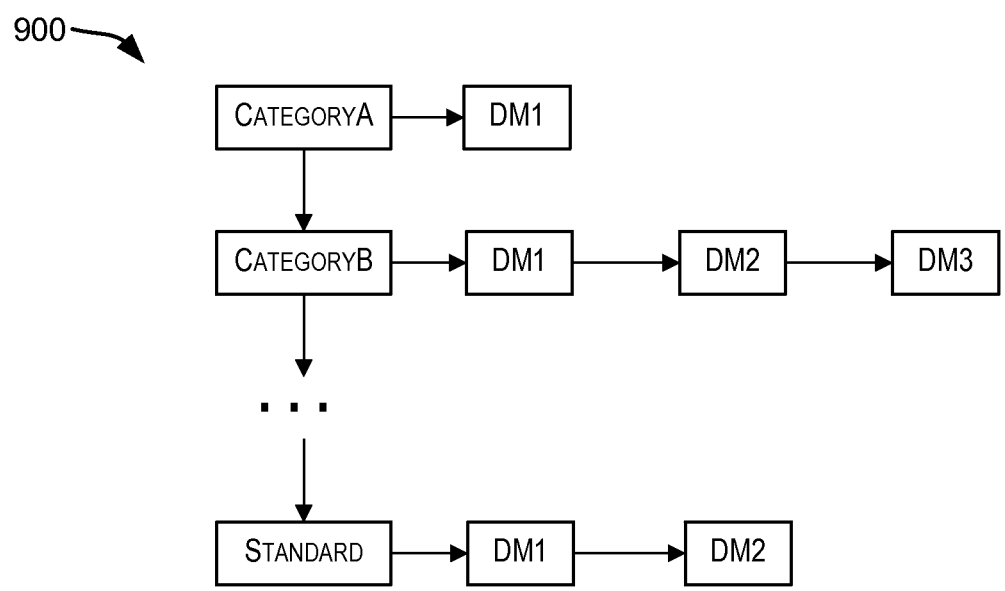
FIG. 9 depicts a simplified diagram of a data structure for storing categories of depth maps according to an embodiment of the present invention.

Different techniques may be used for storing categories and depth maps. For example, different types of data structures may be used to store categorized depth maps. FIG. 9 depicts a simplified diagram of a data structure 900 for storing categories of depth maps according to an embodiment of the present invention. As depicted in FIG. 9, structure 900 comprises a number of queues, with each queue corresponding to a category of depth maps. Each category queue may comprise zero or more depth maps allocated to that category. For example, in the embodiment depicted in FIG. 9, the queue for CategoryA comprises one depth map DM1, the queue for CategoryB comprises three depth maps, and so on. A queue for a "Standard" category is also provided.

In one embodiment, the depth maps within a category queue may be ordered according to some criteria. In one embodiment, the depth maps within a category queue may be ordered based upon the resolution of the depth maps, with depth maps with higher resolution being placed before (closer to the head of the queue) depth maps with lower resolution in the queue depth maps. For example, in FIG. 9, for the queue corresponding to CategoryB, depth map DM1 has a resolution at least as high as depth map DM2 which in turn has a resolution at least as high as depth map DM3.

Figure 10:
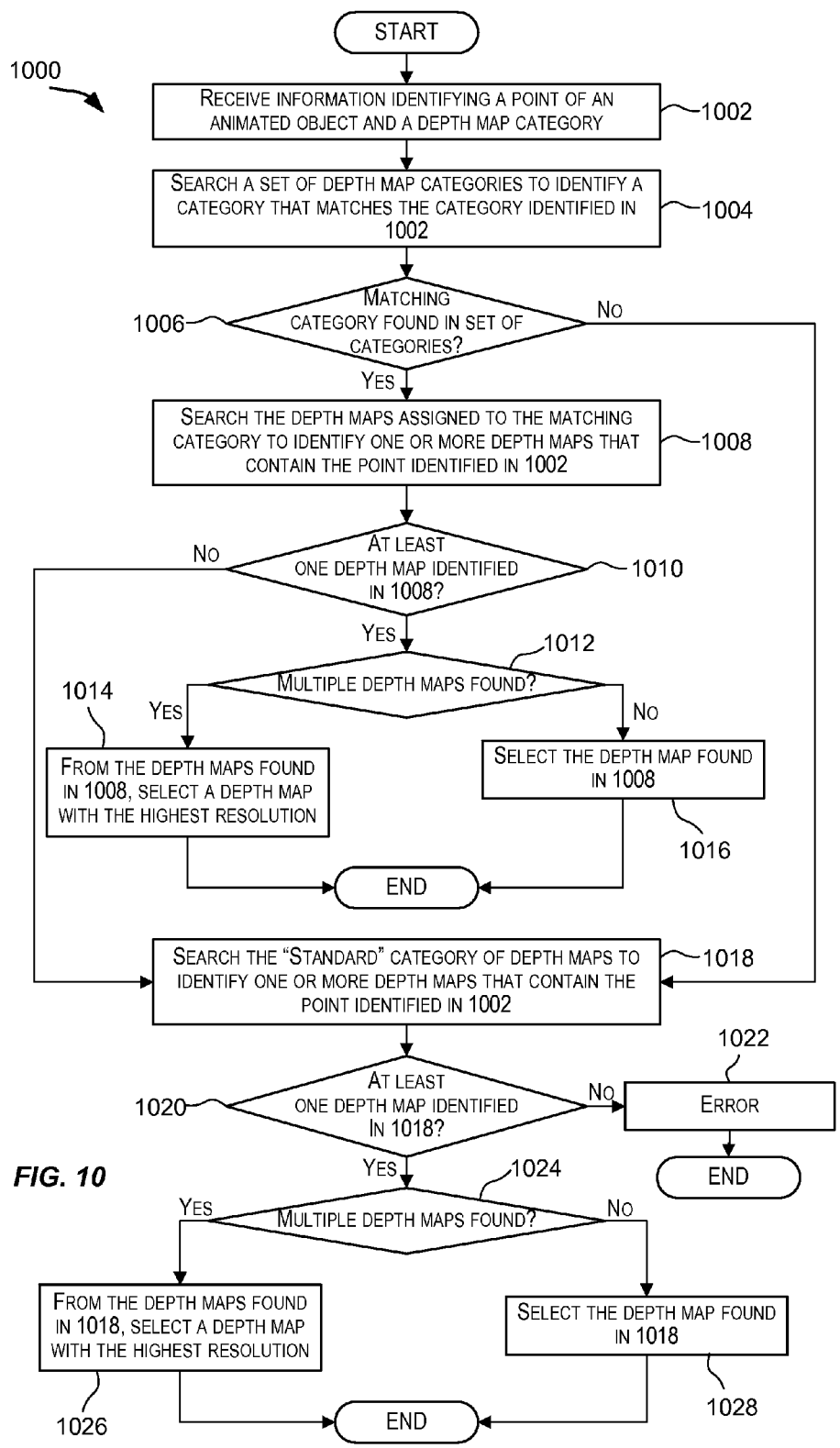
FIG. 10 depicts a simplified flowchart showing a method of selecting a depth map from various categories of depth maps according to an embodiment of the present invention.

In embodiments where multiple depth maps are defined that are possibly classified as belonging to different categories, processing is performed to identify a depth map to be used. FIG. 10 depicts a simplified flowchart 1000 showing a method for selecting a depth map from various categories of depth maps according to an embodiment of the present invention. The processing depicted in flowchart 1000 may be performed by hardware modules, software modules (e.g., code or instructions executed by a processor), or combinations thereof. An animation system may be configured to perform the processing depicted in FIG. 10. The processing depicted in FIG. 10 assumes that the component of an animated object is a point of the animated object. In alternative embodiments, the component may be any geometric attribute of the animated object.

As depicted in FIG. 10, processing is initiated upon receiving information identifying a point of an animated object and information identifying a depth map category (step 1002). The depth map category specified in 1002 may be the one that the animator wants to use for the point.

A set of depth map categories are then searched to find a category in the set that matches the depth map category identified in 1002 (step 1004). The set of depth map categories may be preconfigured and made available to the animation system for processing. In one embodiment, the categories may be stored in a data structure such as the data structure depicted in FIG. 9 or in some other data structure or database. In another embodiment, the information received in 1002 may also comprise the set of depth map categories.

A check is then made to see if a depth map category that matches the depth map category identified in 1002 was found (step 1006). If no matching category was found then processing continues with step 1018 described below. If it is determined in 1006 that a category in the set of depth map categories was found to match the depth map category identified in 1002, then depth maps belonging to the matching category are searched to identify one or more depth maps that contain the point identified in 1002 (step 1008).

A check is then made to see if the search in 1008 identified at least one depth map that contains the point identified in 1002 (step 1010). If not even one depth map is found to contain the point, then processing continues with step 1018 described below. If it is determined in 1010 that at least one depth map from the matching category contains the point, then a determination is made if multiple depth maps are found in 1008 to contain the point (step 1012). If it is determined in 1012 that multiple depth maps from the matching category contain the point, then from the depth maps identified in 1008, the depth map with the highest resolution is selected (step 1014). If a single depth map is found in 1008 to contain the point, then that depth map is selected (step 1016). The selected depth map may then be used to determine the position of the point identified in 1002 relative to the surface represented by the selected depth map. As part of the processing, the selected depth map may be loaded into the RAM of the processing system and then used to find the position of the point relative to the surface represented by the depth map according to the techniques previously described.

As described above, if multiple depth maps are found to contain the point, then the depth map with the highest resolution is selected according to step 1014. In alternative embodiments, other criteria may be used to select a depth map from multiple depth maps.

As previously described, queues may be used to store depth maps for different categories. For example, the data structure depicted in FIG. 9 may be used. As previously described, for a queue corresponding to a particular category, the depth maps within that category may be ordered such that the depth map with the highest resolution is closer to the head of the queue. In such an embodiment, when the queue for the matching category is searched according to 1008, the first depth map in the queue that contains the point is selected since that depth map has at least as high a resolution as any other depth map in the queue that may contain the point.

If it is determined in 1006 that the set of categories does not comprise a category that matches the depth map category identified in 1002 or even if a matching category is found but it is determined in 1010 that none of the depth maps belonging to that category contain the point, then the "standard" category of depth maps is searched to identify depth maps that contains the point identified in 1002 (step 1018). The "standard" category may comprise depth maps that have not been allocated to any other category or depth maps that have been tagged as belonging to the "standard" category.

A check is then made to see if the search in 1018 identified at least one depth map that contains the point identified in 1002 (step 1020). If not even one depth map in the "standard" category is found to contain the point, then this indicates that none of the available depth maps contain the point. An error message may be output (step 1022) and processing ends. If it is determined in 1020 that at least one depth map from the "standard" category contains the point, then a determination is made if multiple depth maps are found in 1018 to contain the point (step 1024). If it is determined in 1024 that multiple depth maps from the "standard" category contain the point, from the depth maps identified in 1018, the depth map with the highest resolution is selected (step 1026). If a single depth map is found in 1018 to contain the point, then that depth map is selected (step 1028). The selected depth map may then be used to determine the position of the point relative to the surface represented by the selected depth map. As part of the processing, the selected depth map may be loaded into the RAM of the processing system and then used to find the position of the point relative to the surface represented by the selected depth map according to the techniques previously described.

As depicted in FIG. 10 and described above, categories of depth maps may be searched to identify a depth map that belongs to a user-specified category and also contains the component of the animated object. If no depth map is found in the categorized depth maps, then the "standard" category of depth maps is searched to find a depth map that contains the component of the animated object. In this manner, the depth map categories are searched prior to searching the standard depth map category. Depth maps belonging to named depth map categories are thus preferred to depth maps belonging to the standard category.

According to an embodiment of the present invention, in addition to categories, depth maps may also be assigned priorities. In one embodiment, multiple priority levels may be provided and depth maps may be assigned to categories and also to one or more priority levels. In order to identify a depth map for a component of an animated object, depth maps assigned to a higher priority are searched prior to depth maps belonging to a lower priority. In one embodiment, the priority levels are (in descending order of priority) "Local", "Shot", "Sequence", and "Set". Accordingly, depth maps belonging to "Local" are searched first, followed by depth maps belonging to "Shot", followed by depth maps belonging to "Sequence" and lastly depth maps belonging to "Set". Other priority levels may be used in alternative embodiments.

Figure 11:
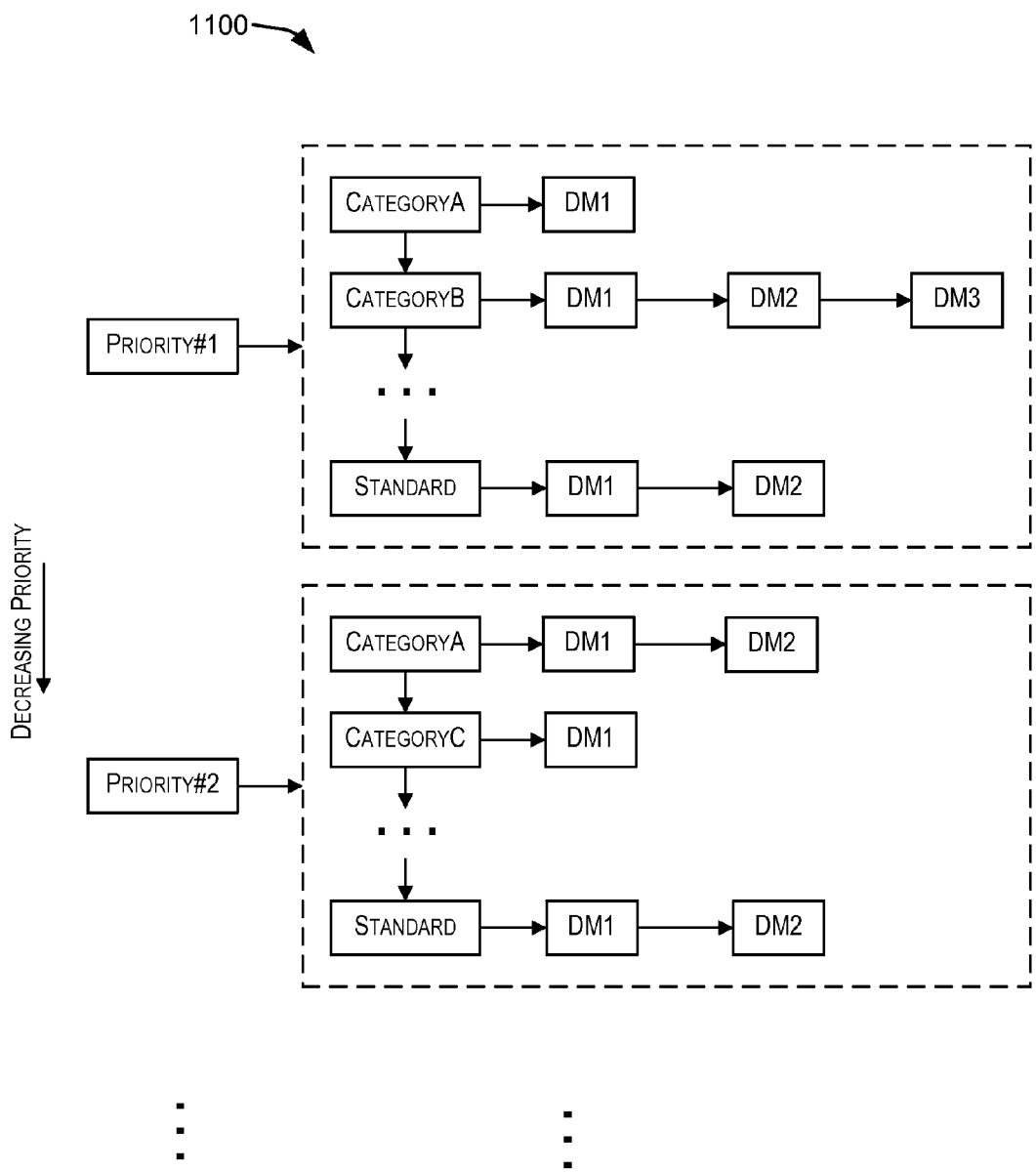
FIG. 11 depicts a simplified data structure for storing categories of depth maps at different priority levels according to an embodiment of the present invention.

Different techniques, including different data structures, may be used for storing depth maps that have been categorized and assigned priorities. FIG. 11 depicts a simplified data structure 1100 for storing categories of depth maps at different priority levels according to an embodiment of the present invention. As depicted in FIG. 11, structure 1100 comprises a number of queues for each priority level. Each priority level may comprise one or more queues corresponding to different depth map categories. A queue for a depth map category may comprise zero or more depth maps belonging to that category and assigned the particular priority. A "standard" category queue may also be provided for each priority level. Within a queue, depth maps may be ordered based upon the resolution of the depth maps, with depth maps with higher resolution being placed before (closer to the head of the queue) depth maps with lower resolution in the queue depth maps. Depth maps belonging to a particular category may be allocated to different priority levels. For example, in the embodiment depicted in FIG. 11, the depth map category "CategoryA" occurs in Priority#1 level and Priority#2 level.

In the embodiment depicted in FIG. 11, Priority#1 has a higher priority than Priority#2. Accordingly, depth maps belonging to Priority#1 will be searched prior to depth maps belonging to Priority#2 in order to identify a depth map. In an alternative embodiment, priority levels may themselves have multiple sub-priority levels, and so on.

Figure 12:
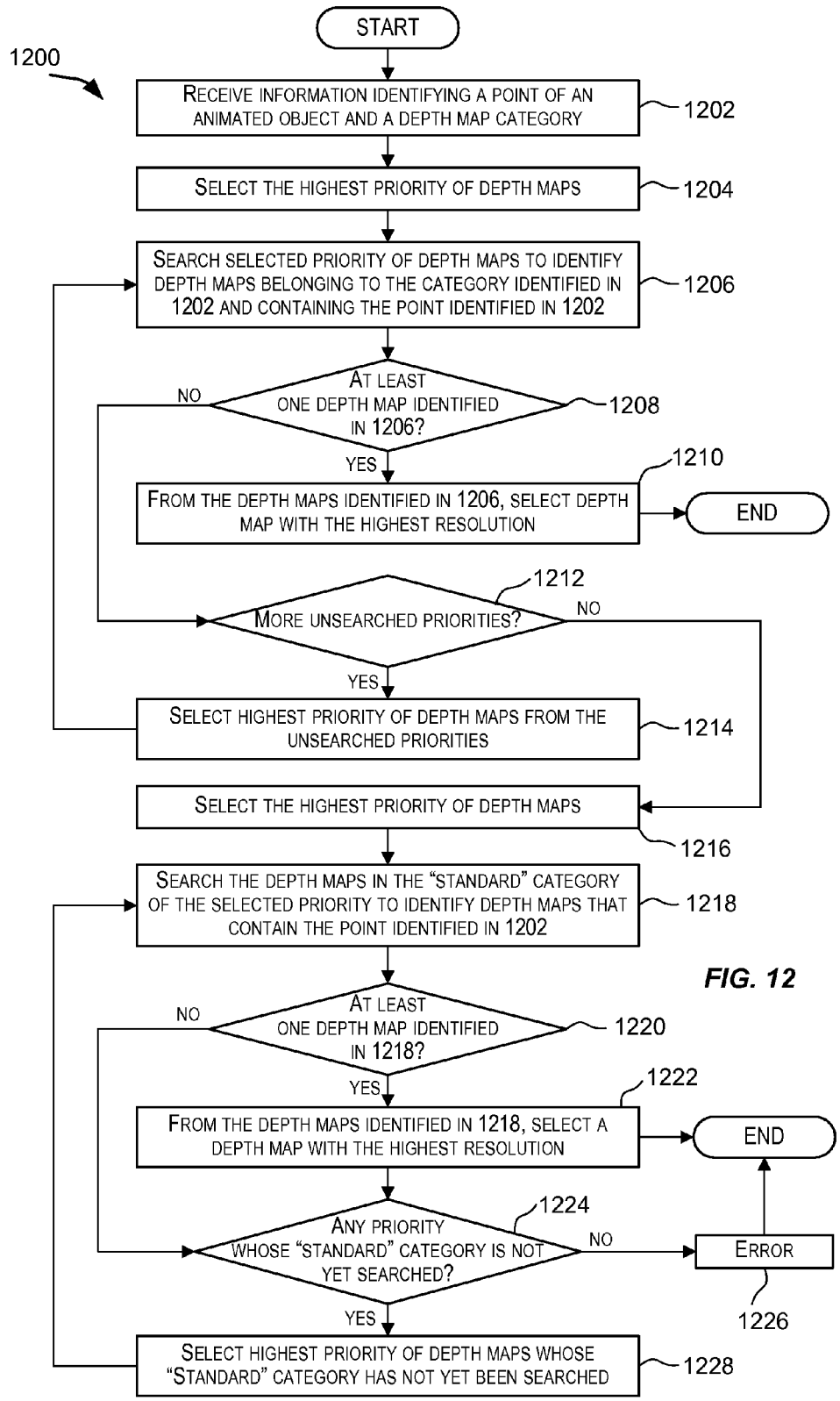
FIG. 12 depicts a simplified flowchart showing a method for selecting a depth map from various categories and priorities of depth maps for animating an object according to an embodiment of the present invention.

FIG. 12 depicts a simplified flowchart 1200 showing a method for selecting a depth map from various categories and priorities of depth maps according to an embodiment of the present invention. The processing depicted in flowchart 1200 may be performed by hardware modules, software modules (e.g., code or instructions executed by a processor), or combinations thereof. An animation system may be configured to perform the processing depicted in FIG. 12. The processing depicted in FIG. 12 assumes that the component of the animated object is a point of the animated object. In alternative embodiments, the component may be any geometric attribute of the animated object.

As depicted in FIG. 12, processing is initiated upon receiving information identifying a point of an animated object and information identifying a depth map category (step 1202). The depth map category specified in 1202 may be the one that the animator wants to use for the point.

The highest priority of depth maps is then selected (step 1204). The depth maps belonging to the selected priority are then searched to identify a depth map that belongs to the category identified in 1202 and that contains the point identified in 1202 (step 1206). In one embodiment, a data structure such as the one depicted in FIG. 11 or a database may be accessed as part of 1206.

A check is then made to see if at least one depth map was identified in 1206 that belongs to the category identified in 1202 and contains also the point identified in 1202 (step 1208). If it is determined in 1208 that at least one depth map is identified in 1206, then, from the identified depth maps, the depth map with the highest resolution is selected (step 1210). The selected depth map may then be loaded into the RAM of the processing system and used to determine the position of the point relative to the surface represented by the selected depth map according to the techniques previously described.

If it is determined in 1208 that not even one depth map was identified in 1206, then it implies that the presently selected priority does not contain a depth map belonging to the category identified in 1202 and containing the point identified in 1202. In this event, a check is made to see if there are more priorities whose depth maps have not yet been searched according to step 1206 (step 1212). If it is determined in 1212 that there is at least one priority level whose depth maps have not been searched according to 1206, then the highest priority level from the priority levels that have not yet been searched is selected (step 1214). Processing then continues with step 1206 wherein the depth maps in the selected priority level are searched.

If it is determined in 1212 that there are no more unsearched priorities (which implies that all the depth map priorities have been searched for a depth map belonging to the category identified in 1202 and containing the point identified in 1202 without success), then it is time to search the "standard" categories of the various priorities and processing continues with step 1216. As part of searching the "standard" categories, the highest priority level of depth maps is selected (step 1216). The depth maps belonging to the "standard" category in the selected priority level are then searched to identify a depth map that contains the point identified in 1202 (step 1218).

A check is then made to see if at least one depth map was identified in 1218 (step 1220). If it is determined in 1220 that at least one depth map is identified in 1218, then, from the identified depth maps, the depth map with the highest resolution is selected (step 1222). The selected depth map may then be loaded into the RAM of the processing system and used to determine a position of the point relative to the surface represented by the depth map according to the techniques previously described.

If it is determined in 1220 that not even one depth map was identified in 1218, then it implies that the presently selected priority does not contain a depth map belonging to the "standard" category that contains the point identified in 1202. In this event, a check is made to see if there are more priorities whose "standard" category of depth maps has not yet been searched according to step 1218 (step 1224). If it is determined in 1224 that there is at least one priority level whose "standard" category of depth maps has yet been searched according to 1218, then the highest priority level of depth maps whose "standard" category has not yet been searched according to 1218 is selected (step 1228). Processing then continues with step 1218 wherein the "standard" category of depth maps for the selected priority level is searched according to 1218.

If it is determined in 1224 that the "standard" category of all the available priority levels has been checked, it indicates that none of the available depth maps contains the point identified in 1202. In this event, an error condition may be output (step 1226) and processing terminates.

In the manner described above, higher priority depth maps are searched prior to lower priority depth maps. Within a priority level, an attempt is made to find a depth map that contains the component of the animated object to be positioned and also belongs to the category identified by the animator. If multiple such depth maps are identified, then the one with the highest resolution is selected. If none of the priority levels comprise a depth map that belongs to the identified category and also contains the components of the animated object, then the "standard" category of depth maps are searched starting with the "standard" category in the highest priority level to the lowest priority level.

In one embodiment of the invention, in addition to identifying a component of an animated object and a category of depth maps, the animator may also specify a priority level. In this case, in one embodiment, only depth maps belong to the user-specified priority level may be searched to find a depth map for the component. In another embodiment, only the user-specified priority and lower priorities may be searched.

Figure 13:
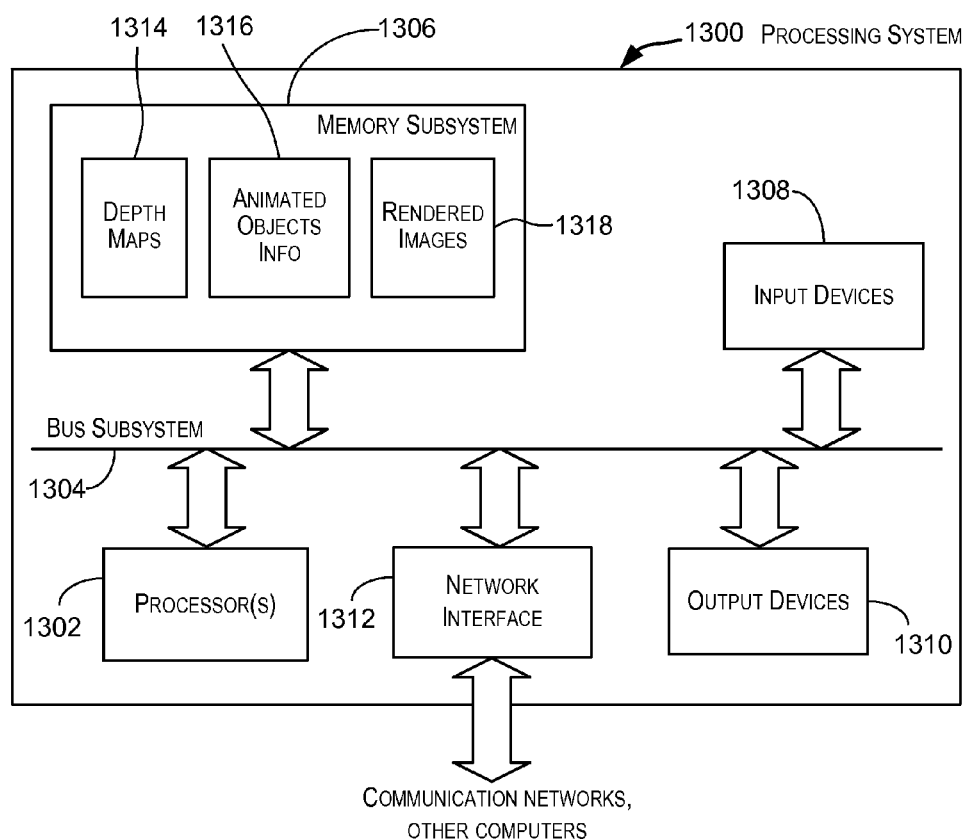
FIG. 13 is a simplified block diagram of a processing system that may be used to practice an embodiment of the present invention.

FIG. 13 is a simplified block diagram of a processing system 1300 that may be used to practice an embodiment of the present invention. For example, system 1300 may be an animation system configured to perform processing as previously discussed. System 1300 may also be used to render scenes.

As shown in FIG. 13, system 1300 includes a processor 1302 that communicates with a number of peripheral devices via a bus subsystem 1304. These peripheral devices may include a memory subsystem 1306, input devices 1308, output devices 1310, and a network interface subsystem 1312. Bus subsystem 1304 provides a mechanism for letting the various components and subsystems of system 1300 communicate with each other as intended. Although bus subsystem 1304 is shown schematically as a single bus, alternative embodiments of the bus subsystem may utilize multiple busses.

Processor 1302 is configured to perform processing performed by system 1300. For example, processor 1302 may be configured to execute code modules or instructions to perform processing according to an embodiment of the present invention. Processor 1302 may also control other subsystems or devices. In some embodiments, processor 1302 may be a graphics processing unit (GPU) such as GPUs provided by ATI, NVidia, or the like. In alternative embodiments, a GPU may be provided in addition to a processor 1302 and may work with processor 1302 to perform the graphics processing.

Input devices 1308 enable a user such as an animator to interact with and provide information to system 1300. Input devices 1308 may include wired or wireless devices such as a keyboard, pointing devices such as a mouse, trackball, touchpad, or graphics tablet, a scanner, a touchscreen incorporated into the display, audio input devices such as voice recognition systems, microphones, and other types of input devices. In general, an input device may refer to any device or mechanism that may be used for inputting information to system 1300. Input devices 1308 typically allow a user to select objects, icons, text and the like that appear on a monitor via a command such as a click of a button or the like.

Output devices 1310 may include wired or wireless devices such as a display subsystem, a printer, a fax machine, or non-visual displays such as audio output devices, etc. Examples of a display subsystem include a cathode ray tube (CRT), a flat-panel device such as a liquid crystal display (LCD), a projection device, etc. In general, an output device may refer to any device or mechanism for outputting information from system 1300. For example, the results of animation and the rendered scenes may be displayed to a user using an output device.

Network interface subsystem 1312 provides an interface to other computer systems, and networks. Network interface subsystem 1312 serves as an interface for receiving data from other sources and for transmitting data to other sources from system 1300. Embodiments of network interface subsystem 1312 include an Ethernet card, a modem (telephone, satellite, cable, ISDN, etc.), (asynchronous) digital subscriber line (DSL) units, FireWire interface, USB interface, and the like. For example, subsystem 1312 may be coupled to a computer network, to a FireWire bus, or the like. In other embodiments, network interface subsystem 1312 may be physically integrated on the motherboard of system 1300, and may be a software program, such as soft DSL, or the like.

Memory subsystem 1306 may be configured to store the basic programming and data constructs that provide the functionality of the present invention. For example, a computer program or software code modules (or instructions) implementing the functionality of the present invention may be stored in memory 1306. These software modules may be executed by processor(s) 1302. Memory 1306 may also provide a repository for storing data used in accordance with the present invention. For example, memory 1306 may also store information 1314 related to depth maps. Memory 1306 may also store information 1316 for various animated objects. Information 1316 may comprise state information related to animated objects, including geometric and non-geometric attributes or primitives of animated objects and other information related to animated objects. Information 1316 may include information about position and orientation of an animated object. Memory 1306 may also store rendered images 1318 that may be output using an output device.

Memory 1306 may include a number of memories including a main random access memory (RAM) for storage of instructions and data during program execution and a read only memory (ROM) in which fixed instructions are stored. RAM is generally semiconductor-based memory that can be read and written by processor 1302. The storage locations can be accessed in any order. RAM is generally understood to refer to volatile memory that can be written to as well as read. There are various different types of RAM. For purposes of this application, references to information being loaded or unloaded from memory during processing refer to loading or unloading the information from RAM (or any other volatile memory used by a program or process during execution) of system 1300. For example, a selected depth map to be used for animation may be loaded into the RAM of memory 1306.

Memory 1306 may also comprise subsystems that provide persistent (non-volatile) storage and caching for program and data files, and may include a hard disk drive, a floppy disk drive along with associated removable media, a Compact Disk Read Only Memory (CD-ROM) drive, an optical drive such as a DVD, removable media cartridges, flash memory, and other like storage media.

Processing system 1300 can be of various types including a personal computer, a portable computer, a workstation, a network computer, a mainframe, a kiosk, or any other data processing system. Due to the ever-changing nature of computers and networks, the description of system 1300 depicted in FIG. 13 is intended only as a specific example for purposes of illustrating the preferred embodiment of a processing system. Many other configurations having more or fewer components than the system depicted in FIG. 13 are possible. For example, the processing system may be a desktop computer, portable computer, rack-mounted or tablet configuration. Additionally, the processing system may be a series of networked computers. Further, the use of different micro processors is contemplated, such as Pentium™ or Itanium™ microprocessors; Opteron™ or AthlonXP™ microprocessors from Advanced Micro Devices, Inc., and the like. Further, use of different types of operating systems is contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

The various techniques described above may be used to render images of the animated object and the surface at different time points (or frames). The rendered images may be stored in a memory or computer-readable medium such as user viewable media (film stock, printed media), magnetic media (hard disk, storage area network, etc), optical media (CD ROM, DVD ROM), holographic memory, semiconductor media (flash memory, RAM, ROM). The rendered images may then be output via an output device to display the resultant animation. The rendered images may be used for full cg animation, or integrated with any other computer-generated objects, combined with live-action images, combined with a matte painting, and the like.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure without departing from the broader spirit and scope of the invention as set forth in the claims. The scope of the invention should, therefore, be determined not with reference to the above description, but instead should be determined with reference to the pending claims along with their full scope or equivalents.

What is claimed is:

1. A computer-implemented method of animating objects, the method comprising:

receiving, at one or more computer systems, information organizing a plurality of depth maps according to a plurality of categories representing surface properties of objects located on surfaces, each depth map in the plurality of depth maps representing a surface comprised of one or more objects and encoding displacement information associated with the one or more objects;

receiving, at the one or more computer systems, information ordering each depth map in the plurality of depth maps in at least one queue associated with at least one category in the plurality of categories based on at least one criteria factor;

determining, with one or more processors associated with the one or more computer systems, a category from the plurality of categories based on information associated with a component of an animated object;

determining, with the one or more processors associated with the one or more computer systems, a depth map from at least one queue associated with the determined category based on a selection criteria and searching each depth map in a set of depth maps in the at least one queue using a position of the component of the animated object relative to the surface represented by the depth map in the set of depth maps;

receiving, at the one or more computer systems, information regarding a projected position for the component of the animated object relative to the surface represented by the determined depth map;

verifying, with the one or more processors associated with the one or more computer systems, that the position of the component of the animated object corresponds to the projected position for the component within a threshold distance from the surface; and generating, with the one or more processors associated with the one or more computer systems, information configured to change one or more of the animated object's properties in a state of the animated object.

2. The method of claim 1 wherein each depth map in the plurality of depth maps is a rendering of an image of depth values of the one or more objects in the surface represented by the depth map.

3. The method of claim 1 wherein determining the depth map from the at least one queue associated with the determined category based on a selection criteria comprises selecting a depth map having the highest resolution.

4. The method of claim 1, further comprising determining the position of the component of the animated object relative to the surface represented by the depth map in the set of depth maps in response to:

computing a position of the component of the animated object in the image space of the depth map; and comparing a depth value of the component of the animated object with a depth value stored by the depth map for the position of the component of the animated object in the image space of the depth map.

5. The method of claim 1 wherein generating the information configured to change the one or more of the animated object's properties comprises modifying of a geometric attribute of the animated object.

6. The method of claim 5 wherein a geometric attribute of the animated object comprises an orientation of the component of the animated object.

7. The method of claim 5 wherein a geometric attribute of the animated object comprises a position of the component of the animated object.

8. The method of claim 7 wherein the modified position of the component of the animated object after the modification lies on the surface represented by the determined depth map.

9. The method of claim 7 wherein modifying the position for the component of the animated object comprises changing the position of the component along a direction used to define the depth map.

10. The method of claim 7 wherein modifying the position for the component of the animated object comprises changing the position of the component along a direction that is different from a direction used to define the depth map.

11. The method of claim 1 wherein determining the depth map is performed without loading one or more models of the one or more objects represented by the depth map or displacement information associated with the one or more models.

12. The method of claim 1 wherein generating the information configured to change the one or more of the animated object's properties comprises modifying a non-geometric attribute of the animated object.

13. The method of claim 12 wherein modifying a non-geometric attribute of the animated object comprises changing color of a portion of the animated object.

14. A non-transitory computer-readable medium storing code executable by one or more processors associated with one or more computer systems for animating objects, the non-transitory computer-readable medium comprising:

code for receiving information organizing a plurality of depth maps according to a plurality of categories representing surface properties of objects located on surfaces, each depth map in the plurality of depth maps representing a surface comprised of one or more objects and encoding displacement information associated with the one or more objects;

code for receiving information ordering each depth map in the plurality of depth maps in at least one queue associated with at least one category in the plurality of categories based on at least one criteria factor;

code for determining a category from the plurality of categories based on information associated with a component of an animated object;

code for determining a depth map from at least one queue associated with the determined category based on a selection criteria and searching each depth map in a set of depth maps in the at least one queue using a position of the component of the animated object relative to the surface represented by the depth map in the set of depth maps;

code for receiving information regarding a projected position for the component of the animated object relative to the surface represented by the determined depth map;

code for verifying that the position of the component of the animated object corresponds to the projected position for the component within a threshold distance from the surface; and code for generating information configured to change one or more of the animated object's properties in a state of the animated object.

15. The non-transitory computer-readable medium of claim 14 wherein each depth map in the plurality of depth maps is a rendering of an image of depth values of the one or more objects in the surface represented by the depth map.

16. The non-transitory computer-readable medium of claim 14 wherein code for determining the depth map from the at least one queue associated with the determined category based on a selection criteria comprises selecting a depth map having the highest resolution.

17. The non-transitory computer-readable medium of claim 14, further comprising code for determining the position of the component of the animated object relative to the surface represented by the depth map in the set of depth maps in response to:

computing a position of the component of the animated object in the image space of the depth map; and comparing a depth value of the component of the animated object with a depth value stored by the depth map for the position of the component of the animated object in the image space of the depth map.

18. The non-transitory computer-readable medium of claim 14 wherein the code for generating the information configured to change the one or more of the animated object's properties comprises code for modifying a geometric attribute of the animated object.

19. The non-transitory computer-readable medium of claim 18 wherein a geometric attribute of the animated object comprises a position of the component of the animated object.

20. The non-transitory computer-readable medium of claim 18 wherein the modified position of the component of the animated object after the modification lies on the surface represented by the determined depth map.

21. The non-transitory computer-readable medium of claim 18 wherein the code for modifying the position for the component of the animated object comprises code for changing the position of the component along a direction used to define the depth map.

22. The non-transitory computer-readable medium of claim 18 wherein the code for modifying the position for the component of the animated object comprises changing the position of the component along a direction that is different from a direction used to define the depth map.

23. The non-transitory computer-readable medium of claim 18 wherein a geometric attribute of the animated object comprises an orientation of the component of the animated object.

24. The non-transitory computer-readable medium of claim 14 wherein the code for generating the information configured to change the one or more of the animated object's properties comprises code for modifying a non-geometric attribute of the animated object.

25. The non-transitory computer-readable medium of claim 24 wherein the code for modifying a non-geometric attribute of the animated object comprises changing color of a portion of the animated object.

26. The non-transitory computer-readable medium of claim 14 wherein the code for determining the depth map is performed without loading one or more models of the one or more objects represented by the depth map or displacement information associated with the one or more models.

* * * * *